April 22, 1924.

J. H. DENNY 1,491,744

AUTOMOBILE HEATER

Filed April 6, 1922

Inventor
J. H. Denny

By J. R. Bryant
Attorney

Patented Apr. 22, 1924.

1,491,744

UNITED STATES PATENT OFFICE.

JOHN H. DENNY, OF WASHINGTON, INDIANA.

AUTOMOBILE HEATER.

Application filed April 6, 1922. Serial No. 550,010.

*To all whom it may concern:*

Be it known that I, JOHN H. DENNY, a citizen of the United States of America, residing at Washington, in the county of Daviess and State of Indiana, have invented certain new and useful Improvements in Automobile Heaters, of which the following is a specification.

This invention relates to automobile heaters and has particular reference to a device for confining and directing the heat radiating from the exhaust manifold of an automobile gas engine into the interior of the automobile, preferably discharging the heated air at a point adjacent the driver's seat and front floor board.

The primary object of the invention resides in the provision of a heater for automobiles in the form of a jacket or hood overlying the exhaust manifold of the gas engine for delivering the heated air to a foot warmer positioned upon the floor board of the automobile, a manually operable damper being associated with the hood for tempering the heated air passing therethrough while another damper is associated with the device for entirely cutting off the flow of heated air to the foot warmer.

A further object of the invention refers to the particular mounting of the device, the heat confining jacket or hood associated with the exhaust manifold having its rear end extending to the automobile dash, while the foot warmer connected to the hood is placed in position at a point within the automobile body, the damper positioned upon the inner face of the dash closing the opening formed therein for the mounting of the heater when the latter is removed from the engine and dash.

With the above general objects in view and others that will appear as the nature of the invention is better understood, the same consists in the novel construction, combination and arrangement of parts hereinafter more fully described, illustrated in the accompanying drawings, and then claimed.

Figure 1:
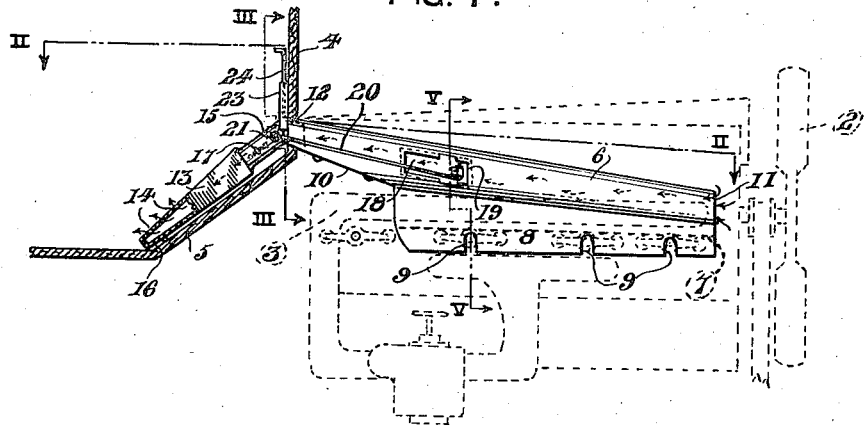
Figure 1 shows by dotted lines, a side elevational view of an automobile gas engine with the heater operatively connected to the exhaust manifold thereof, and further showing in section, the dash and floor board of the automobile.
Figure 3:
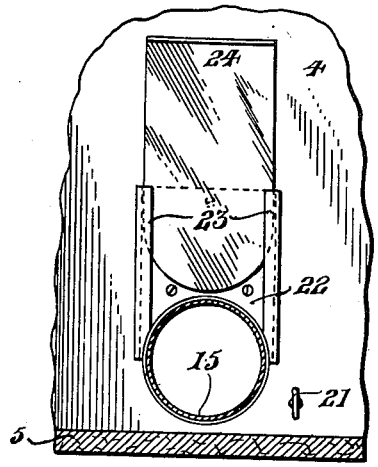
Figures 4, 5:
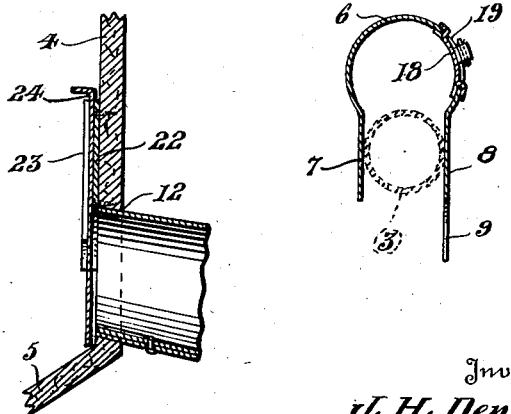

Figure 3 is a detail sectional view taken on line III—III of Figure 1 showing the sliding damper controlling communication between the heat confining hood and the foot warmer, Figure 4 is a detail sectional view taken at right angles to Figure 3 showing the sliding damper in its closed position, and Figure 5 is a detail sectional view taken on line V—V of Figure 1 showing the heat confining hood inclosing the exhaust manifold and the sliding damper carried by the hood.

Figure 2:
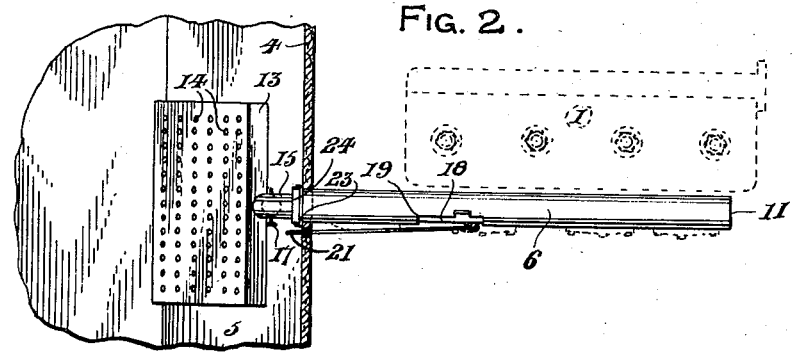
Figure 2 is a longitudinal sectional view taken on line II—II of Figure 1 showing the foot warmer resting upon the floor board of the automobile and connected to the heat confining hood.

In the accompanying drawing, wherein there is illustrated the preferred embodiment of the invention, there is shown by dotted lines in Figures 1 and 2 a gas engine 1 provided with the usual cooling fan 2 and an exhaust manifold 3, the engine as is customary being positioned forwardly of the dash 4 and floor board 5 of the body of the automobile.

The heater associated with the exhaust manifold 3, dash and floor boards 4 and 5 respectively embodies a jacket or hood 6 having an arcuate upper wall carrying for a portion of its length depending inner and outer walls 7 and 8 respectively, the outer wall being notched as at 9 to allow the passage of the anchoring bolts for the exhaust manifold, and also for securing the heater in position on the manifold 1 as shown in Figure 1. The hood 6 is inclined upwardly and rearwardly as shown in Figures 1 and 4 and is of increased cross-sectional area at a point substantially intermediate the ends thereof to provide a greater heat confining space within the hood. The hood 6 is closed at its lower side rearwardly of the side walls 7 and 8, the hood being open at its lower side adjacent said side walls, and also open at its forward end as at 11 adjacent the fan 2. The rear end of the hood extends into an opening 12 provided in the dash 4 adjacent the floor board 5 with the end thereof substantially flush with the inner face of said dash.

A foot warmer is associated with the inner end of the hood and embodies a casing 13 having the upper wall thereof perforated as at 14, the forward wall of the warmer carrying a pipe section 15 that freely extends into the rear end of the hood 6 as shown in Figures 1 and 2, the bottom wall of the foot warmer carrying feet 16 spacing the same from the floor board 5.

To regulate the quantity of the heated air delivered through the hood 6 to the foot warmer 13, there is provided a damper 17 in the pipe section 15 while a damper associated with the hood 6 controls the temperature of the heated air, and also provides for the admission of unheated air. The latter damper shown more fully in Figures 1, 2 and 5, embodies a sliding damper plate 18 over-lying a cut-away portion 19 in the side of the upper wall of the hood, the same being suitably guided in its sliding movement and being secured to an operating rod 20 extending through an opening in the dash 4 and having upon the inner end thereof a handle 21.

For the purpose of entirely cutting off the supply of heated air from the hood to the foot warmer 13, a plate 22 having vertical side flanges 23 is secured to the inner face of the dash 4, the side flanges 23 guiding a damper valve 24 that is adapted to be lowered to a position to overlie the opening 12 shown in Figures 3 and 4, the foot warmer 13 being rearwardly removable from the rear end of the hood while said hood may remain in position upon the exhaust manifold and be rendered inoperative by the damper 24.

From the above detailed description of the device it is believed that the construction and operation thereof will be at once understood, it being noted that the fan 2, during the operation of the engine 1, will direct air through the open forward end 11 of the hood into contact with the exhaust manifold, the air being heated by radiation from the exhaust manifold and delivered to the foot warmer 13 as will at once be obvious, the supply thereof being controlled by the damper 17 in the pipe section 15. The sliding damper 18 regulates the temperature of the air, and also provides for the admission of a greater quantity of air to the hood 6. When it is desired to disconnect the heater from the engine, the foot warmer 13 is disengaged from the rear end of the hood 6 and the sliding damper plate 24 lowered to the closed position shown in Figure 4 entirely cutting off the supply of heated air to the interior of the automobile. The hood 6 may remain in position upon the exhaust manifold, or be disengaged therefrom if desired. The principal feature of the invention resides in the particular connection between the hood and the foot warmer, the rear end of the hood extending into the opening 12 provided in the dash 4 while the foot warmer is placed in position from a point within the body of the automobile. The sliding damper plate 24 may be of such construction and design as to in no manner interfere with the design and lines of the dash and when the heater is out of use, will not materially detract from the lines of the dash.

While there is herein shown and described the preferred embodiment of the invention, it is nevertheless to be understood that various forms, modifications and arrangements of the parts may be made without departing from the spirit and scope of the invention as claimed.

What is claimed as new is:—

In a device of the class described, a heater for automobiles including an inverted U-shaped hood overlying the exhaust manifold of a gas engine, the outer wall of the hood being of greater depth than the inner wall and depending beneath the exhaust manifold with the side walls of the hood contacting the manifold, means for connecting said hood to said manifold, said side walls being parallel and the upper end of the hood being enlarged and disposed above the manifold and inclined upwardly rearwardly with respect thereto, said hood having an air inlet opening in one wall thereof, a damper valve adapted to control said inlet, a damper for closing the inner end of said hood, a foot warmer within the automobile, a pipe section connecting the foot warmer and the inner end of said hood, and a damper in said pipe section.

In testimony whereof I affix my signature.

JOHN H. DENNY.